Nov. 9, 1937.  W. H. FURNESS  2,098,778
STEERING DEVICE FOR AUTOMOBILES
Filed Aug. 15, 1934  5 Sheets—Sheet 1

INVENTOR
William H. Furness
BY
Synnestvedt & Lechner
ATTORNEYS

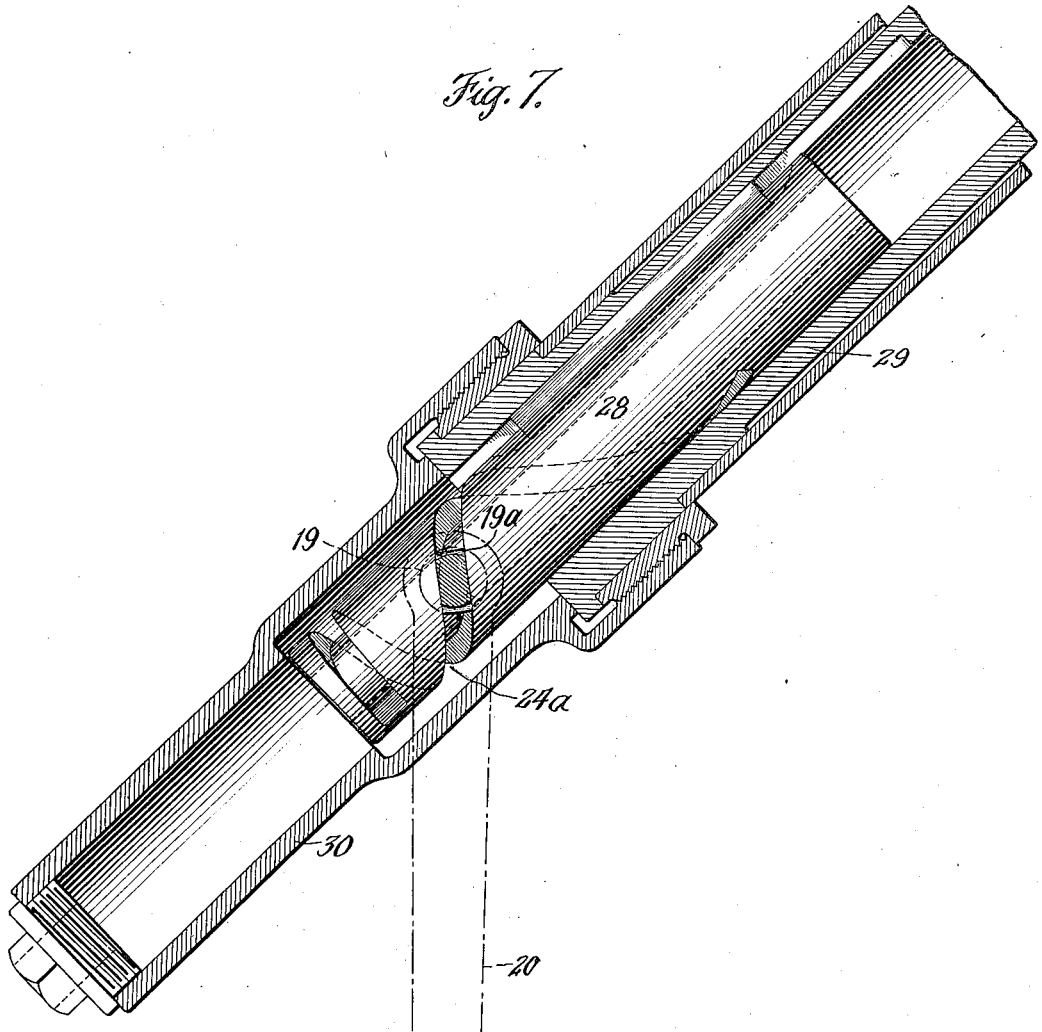

Nov. 9, 1937.  W. H. FURNESS  2,098,778
STEERING DEVICE FOR AUTOMOBILES
Filed Aug. 15, 1934  5 Sheets-Sheet 4
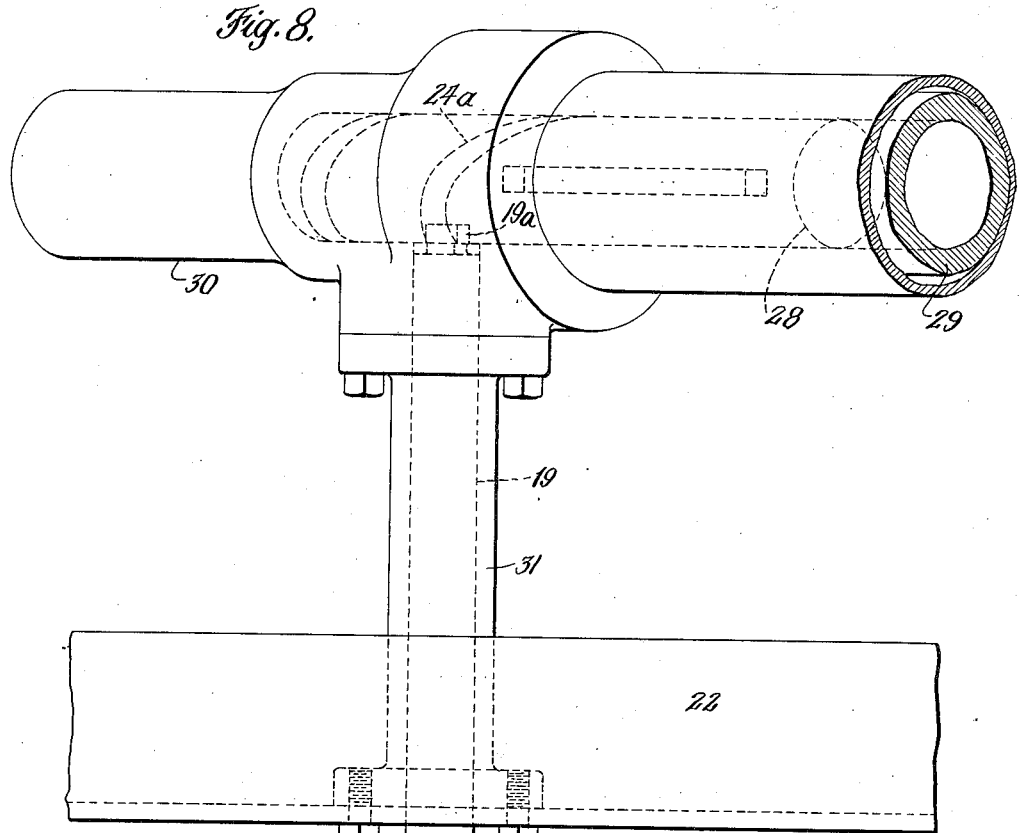
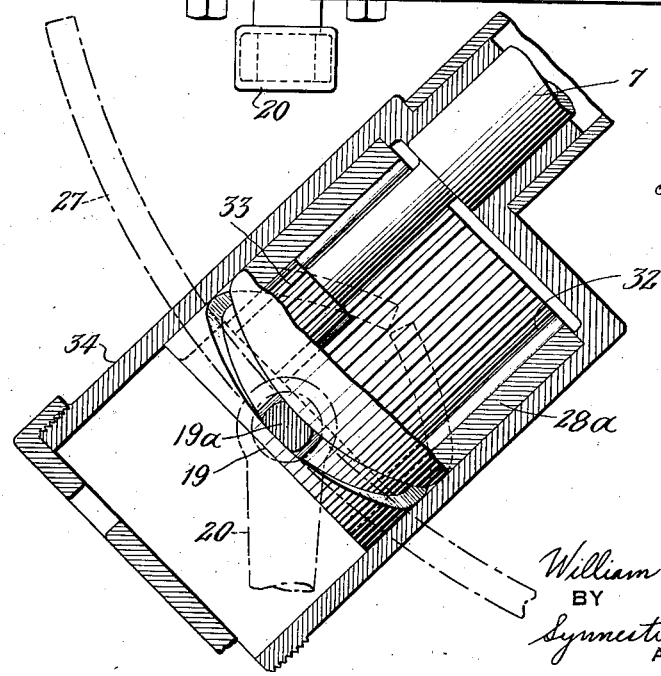
INVENTOR
William H. Furness
BY
Synnestvedt & Lechner
ATTORNEYS Nov. 9, 1937.  W. H. FURNESS  2,098,778
STEERING DEVICE FOR AUTOMOBILES
Filed Aug. 15, 1934   5 Sheets-Sheet 5
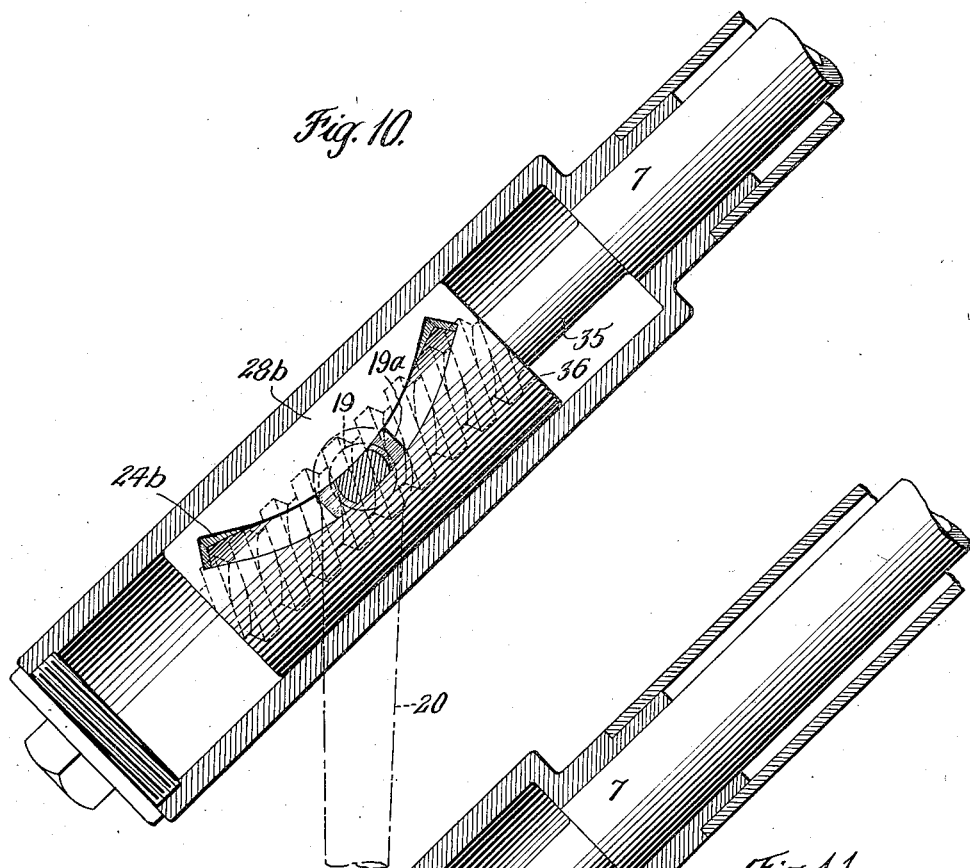
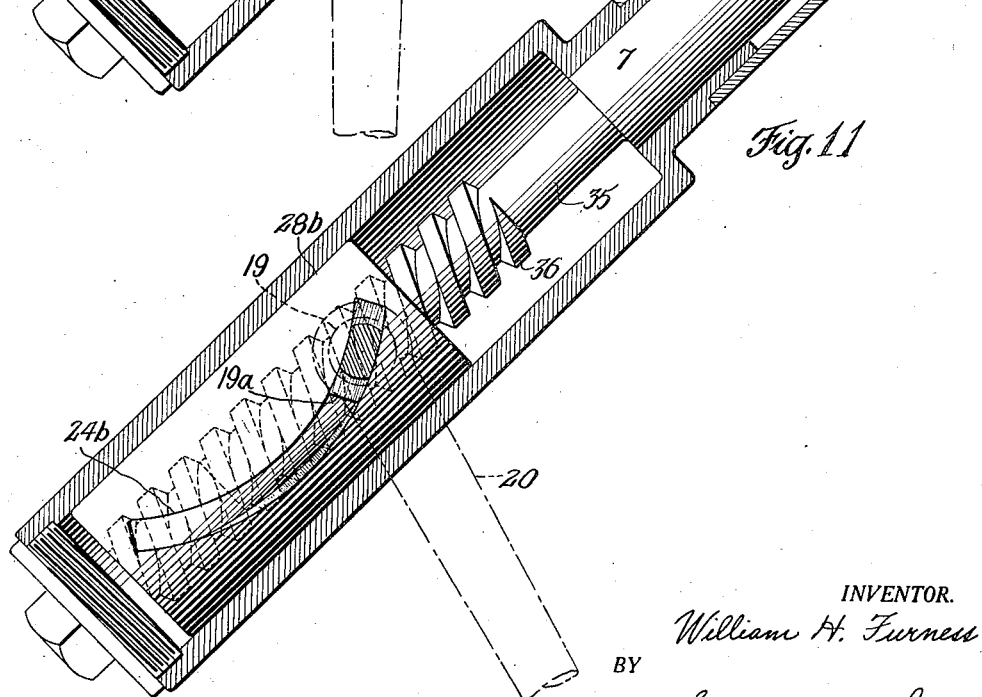
INVENTOR.
William H. Furness
BY
Synnestvedt & Lechner
ATTORNEYS Patented Nov. 9, 1937

2,098,778

UNITED STATES PATENT OFFICE 2,098,778

STEERING DEVICE FOR AUTOMOBILES

William H. Furness, Riverton, N. J., assignor to American Rayon Company, Inc., Riverton, N. J., a corporation of New Jersey Application August 15, 1934, Serial No. 739,881

14 Claims. (Cl. 74—500)

This invention relates to steering devices for automobiles.

One of the primary objects of the invention is to provide a quick-acting irreversible steering device. I am aware that it has heretofore been proposed to provide an irreversible steering gear in which manipulation of the steering wheel by the operator produces the desired turning of the wheels and in which forces applied at the wheels are not transmitted to the steering wheel. These however, insofar as I have been aware, have not been quick-acting.

More specifically it is an object of the invention, therefore, to provide a simple and effective quick-acting irreversible device.

I have illustrated several embodiments of my invention in the accompanying drawings, wherein—

In this form of my invention rotary movement of the steering rod is transmitted through the medium of a toothed disk. In the form of Figures 5 to 8 inclusive, rotary movement of the steering rod is transmitted through the medium of a slotted cylindrical member. Of these latter figures—

Figure 5:
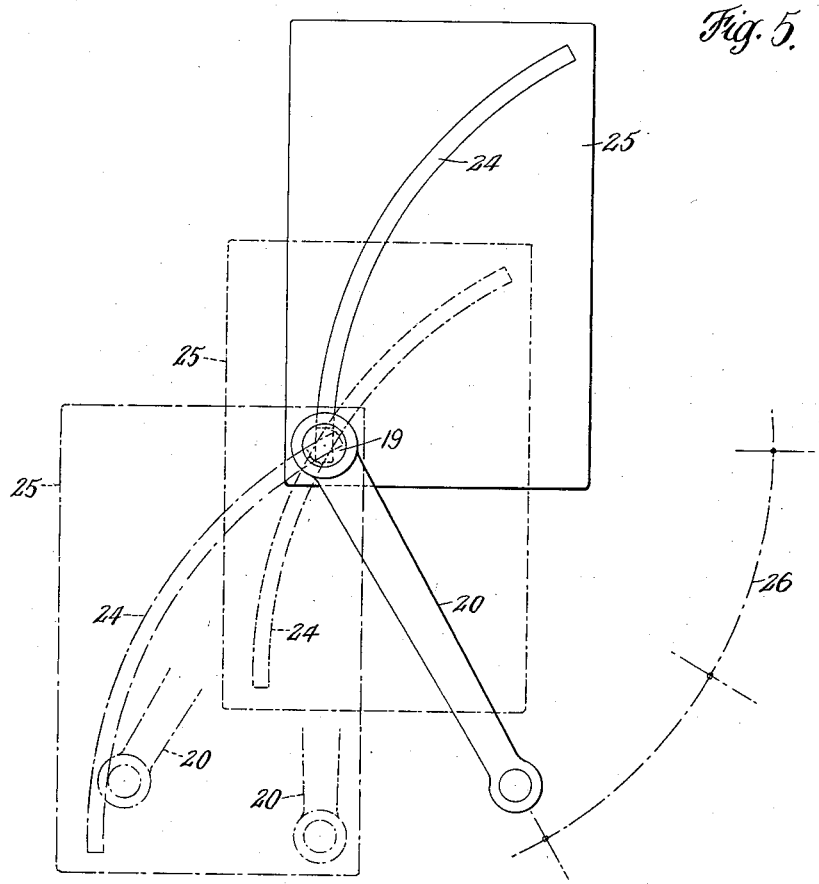
Figure 6:
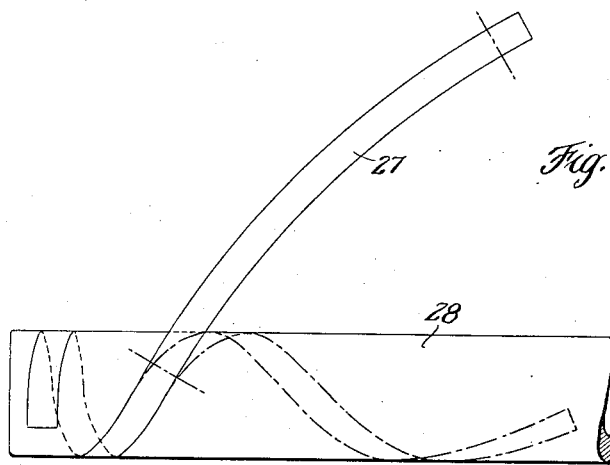

Figure 5 is a diagrammatic view illustrating the principle employed in this form of device;

Figure 6 is a diagrammatic view illustrating one way in which the proper form of slot may be provided for the cylindrical member;

Figure 7 is a sectional view illustrating the device of this form of my invention, and Figure 8 is a view showing how the same is supported in the frame of the vehicle.

Figure 9 is a sectional view illustrating a modification of the device of Figure 7, and Figures 10 and 11 are sectional views corresponding to Figure 7, illustrating still another modification of the form of device therein shown.

Figure 1:
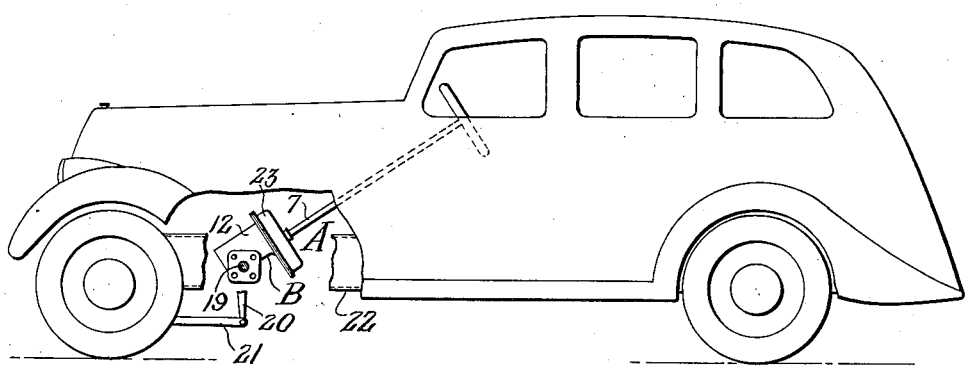
Figure 1 is a diagrammatic side elevation of an automobile, partly broken out in order to illustrate one form of my invention.
Figure 2:
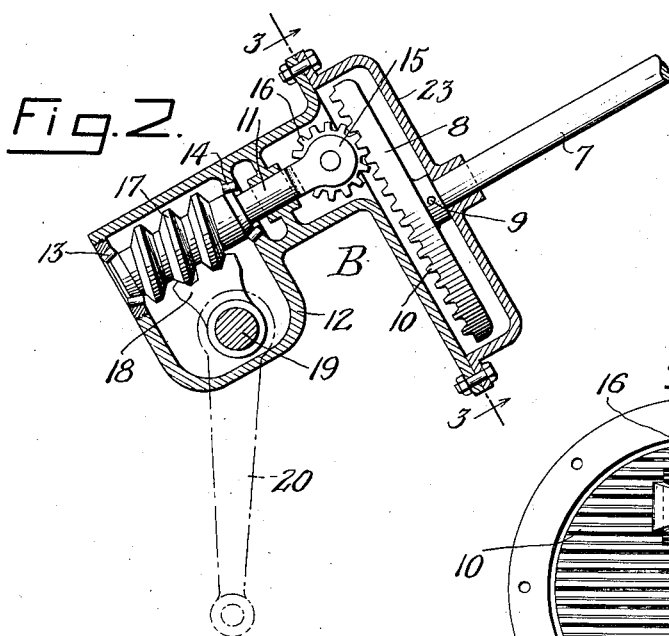
Figure 2 is an enlarged sectional view illustrating certain details of the arrangement of Figure 1.
Figure 3:
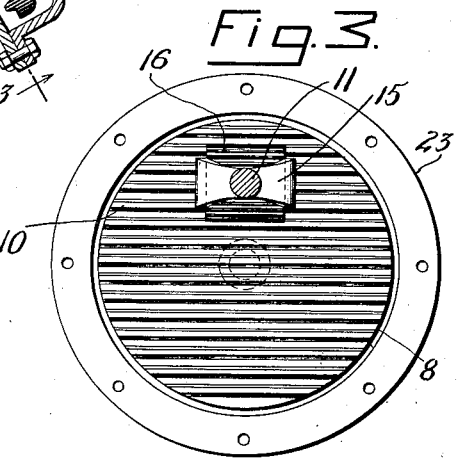
Figure 3 is a section taken on the line 3—3 of Figure 2.
Figure 4:
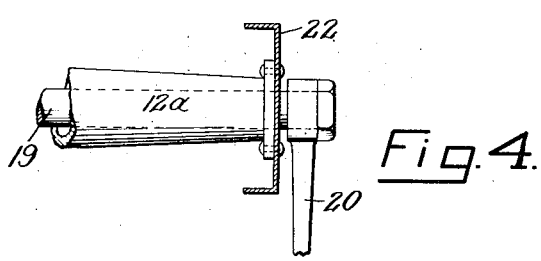
Figure 4 is a fragmentary view illustrating how the device of Figure 1 is mounted.

Referring now to Figures 1 to 4 inclusive, the reference character A designates the steering gear as an entirety and the reference character B the quick-acting irreversible device forming part of the steering gear. In this form of my invention the steering rod 7 has a disk 8 secured to its lower ends as by means of a pin 9 so that the disk rotates with the steering rod. The disk 8 has a plurality of parallel teeth 10 extending in a direction across the face thereof. 11 is a shaft mounted in the casing 12 by means of bearings such as the roller bearings 13—14. The shaft has a yoke 15 at one end thereof in which is revolubly mounted a toothed wheel or roller 16 the teeth of which are adapted to mesh with the teeth 10 of the disk 8. The shaft 11 is offset with respect to the shaft 7. The shaft 11 has a worm 17 for engaging the worm segment 18 mounted at one end of the rock shaft 19. A rocker arm 20 is mounted on the other end of the rock shaft. The housing 12 has a tubular extension 12a by means of which it is secured to one of the side frames 22 of the automobile as shown in Figure 4. The disk 8 is housed by the member 23 secured to the casing 12. The usual link 21 connects the rocker arm to the steering arm on one of the wheels (not shown).

The operation is as follows: When the rod 7 is rotated by manipulation of the usual steering wheel, the disk 8 is correspondingly rotated, the disk in turn causing the shaft 11 to correspondingly rotate. It will be seen that as the angle of the teeth 10 changes with rotation of the disk 8, the angle of the toothed roller 16 is correspondingly changed and the shaft 11 will be thereby caused to rotate. This is made possible by virtue of the fact that the roller 16 is free to rotate on its own axis. There is thus a one-to-one drive between the steering rod 7 and the shaft 11. If, however, the shaft 11 is sufficiently eccentric with respect to the steering rod 7 the driving connection is irreversible, that is to say, any turning force applied to the shaft 11 will not cause any rotary movement to be imparted to the disk 8 and, therefore, to the rod 7. Hence any forces on the front wheels of the automobile tending to rock the arm 20 are not transmitted to the rod 7 which will remain in any position of adjustment set by the operator until such time as the operator manipulates the wheel.

Usually the front wheels are arranged so as to be swung 60° from extreme turning positions, right and left, and the rocker arm 20 is, therefore, usually swung through a maximum of 60°. It is also customary to provide a reduction between the steering rod and the rocker arm, say, for example, three complete turns of the steering rod, giving the 60° throw of the rocker arm. The desired reduction in this form of the invention is provided by the worm 17 and the worm segment 18.

Greater simplicity and compactness is obtained in the arrangement of Figure 7 wherein the rocking movement is imparted to the rocker arm by means of a slotted cylindrical member, the principle of operation being illustrated in Figure 5. If we cut out a curved slot 24 in a flat plate 25 and shape the end of the rock shaft 19 to fit in said slot, it will be seen that if the plate be moved in the arc indicated by the reference numeral 26, the rocker arm 20 will be rocked from one extreme position to the opposite extreme position. Three positions of the rocker arm are shown in Figure 5, extreme right, extreme left, and mid position. To get the same action with a cylindrical member instead of a plate 25, the curve must be retained in the slot cut in the cylindrical member. A convenient way for getting the right shape of slot is to cut a templet in the form of a ribbon 27 of the right curvature and wrap this around and secure it to the cylindrical member 28, as shown in Figure 6. The slot 24a is then milled out in the cylindrical member 28 and the latter is splined in the tubular portion 29 constituting the end of or a member secured to the steering rod. The cap 30 completes the housing and is secured to the side frame member 22 by means of the sleeve 31 through which the rock shaft 19 extends with its inner end shaped as indicated at 19a to fit the slot. In Figure 7 the rocker arm 20 is shown in mid position. The operation is as follows: When the steering rod is rotated the member 29 rotates, which, in turn, causes the cylindrical member 28 to rotate. Since the position of the rocker shaft 19 is fixed, cylindrical member 28 is caused to move up or down, as the case may be, and as it moves the engagement of the end 19a of the rock shaft with the side walls of the slot, causes the rock shaft to rotate, correspondingly swinging the arm 20. With the slot cut out in this form, no additional reduction means is required as but a turn and a half of the steering wheel will swing the rocker arm from mid position to either of its extreme positions, making a total of about three revolutions of the steering wheel to give a 60° swing to the rocker arm. In this arrangement of the slot it takes somewhat more movement of the steering wheel to swing the rocker arm from mid position to one of its extreme positions than from mid position to its other extreme position.

The arrangement is irreversible, i. e., forces transmitted from the wheels of the automobile to the rocker arm 20 and shaft 19, do not rotate the member 28. Any such force, of course, tends to rotate the shaft 19 about its axis and diagonally opposite corners of the portion 19a press against opposite walls of the slot, one edge tending to cause the cylindrical member 28 to rotate in one direction and the other edge tending to rotate it in the opposite direction. The turning effort exerted by one edge is, therefore, neutralized by the turning effort of the other edge, with the result that no turning movement is imparted to the cylindrical member 28 and hence the parts stay in the position set by the operator until such time as he chooses to manipulate the steering wheel.

The arrangement of Figure 7 requires a long throw for the cylindrical member 28. To shorten the throw I have provided the arrangement of Figure 9 in which the dotted line 27 indicates the templet for laying out the slot. The templet is applied at its middle portion to the cylindrical member 28a and the ends are wrapped around as indicated. This gives a short throw for the cylindrical member 28a to get which, however, the diameter of the member 28a must be substantially increased over that of the member 28 of Figure 7. This arrangement also requires the provision of reduction means if the customary three turns of the steering wheel for swinging the rocker arm through its complete arc of 60° is to be retained. In the particular embodiment shown in Figure 9 this is obtained by providing teeth 32 on the inner wall of the member 28a and providing a toothed extension member 33 on the steering rod 7. A simple housing 34 is provided and secured to the side frame member 22 as before.

I have illustrated a preferred form of my invention in Figures 10 and 11 in which the slot 24b in general extends lengthwise of the cylindrical member 28b, the parts being shown in mid position in Figure 10 and at one extreme in Figure 11. In this form the steering rod 7 has a bottom extension member 35 having a square thread 36. The inside of the member 28b is similarly threaded. The operation is as follows: When the steering rod 7 is rotated the member 28b is either raised or lowered from the position shown in Figure 10 which causes the rock shaft to rotate. During this operation the member 28b itself rotates somewhat as will be readily apparent from examination of the drawings. The pitch of the threads is calculated to deliver the desired reduction. This form like that of Figures 7 and 9 is irreversible for the reasons previously pointed out.

It will be seen that in all forms it is a change in angularity of the member associated with the steering rod which effects rotary movement of the rock shaft. In the form of Figures 1 to 4 inclusive there is change of angularity of the teeth 10 as the disk rotates which is translated into rotary movement of shaft 11 and, therefore, of shaft 19. In the other forms it is change of angularity of the slot in the cylindrical member associated with the steering rod which effects rotary movement of the flatted portion fitting the slot and therefore of the rock shaft with which it is preferably integral. It is also to be understood that the connecting link 21 may have the usual yielding means such as springs at both ends, for cushioning purposes. These are not shown in the drawings but are ordinarily employed in the standard steering gear.

The advantages of an irreversible steering gear will be readily understood by those skilled in the art. It is also to be understood that the invention is useful for other purposes than for the steering gear of an automobile and the invention is not to be understood as being limited to a steering wheel.

I claim:—

1. In a steering gear for automobiles, the combination of a steering rod, a rock shaft, and a quick acting irreversible driving connection therebetween comprising two interfitted portions one of which is a cylindrical member having a peripheral curved slot which if developed in a flat plane would be an arc of a circle, and the other of which fits the slot and is fixedly carried by the rock shaft axially thereof.

2. In a steering gear for automobiles, the combination of a steering rod, a rock shaft, and a quick acting irreversible driving connection therebetween comprising two interfitted portions one of which is a cylindrical member having a peripheral curved slot which if developed in a flat plane would be an arc of a circle, and the other of which is a flattened end on the rock shaft fitting the slot.

3. In a steering gear for automobiles, the combination of a steering rod, a rock shaft, and a quick acting irreversible driving connection therebetween comprising two interfitted portions one of which is a cylindrical actuating member connected to the steering rod for movement thereby and having a curved slot which if developed in a flat plane would be an arc of a circle, and the other of which fits the slot and is fixedly carried by the rock shaft axially thereof.

4. In a steering gear for automobiles, the combination of a steering rod, a rock shaft, and a quick acting irreversible driving connection therebetween comprising two interfitted portions one of which is a cylindrical member mounted for rotational and longitudinal movement and cooperating with the steering rod, said cylindrical member having a peripheral curved slot which if developed in a flat plane would be an arc of a circle, and the other of which fits the slot and is non-rotatable with the shaft, said slot being so annularly and longitudinally disposed as to give a reduction between steering rod and rock shaft.

5. In a steering gear for automobiles, the combination of a steering rod, a rock shaft, and a quick acting irreversible driving connection therebetween comprising two interfitted portions one of which is a cylindrical member mounted for rotational and longitudinal movement and cooperating with the steering rod, said cylindrical member having a peripheral curved slot which if developed in a flat plane would be an arc of a circle, and the other of which fits the slot and is non-rotatable with the shaft, and means providing a reduction as between steering rod and rock shaft.

6. In a steering gear, the combination of a steering rod, a rock shaft, a shoe fixedly carried by the rock shaft with its axis aligned with the axis of the rock shaft, an actuating member having a curved slot receiving the shoe, and means connecting said member to the steering rod for movement by the steering rod effecting rotation of the shoe and rock shaft.

7. In a steering gear, the combination of a steering rod, a rock shaft mounted for rotation on an axis at right angles to the axis of the steering rod, a shoe fixedly carried by the rock shaft in axial alignment therewith, an actuating member having a curved slot receiving said shoe, and means connecting said member to the steering rod for movement by the steering rod effecting rotation of the shoe and rock shaft.

8. In a steering gear, the combination of a steering rod, a rock shaft mounted for rotation on an axis at right angles to the axis of the steering rod, a shoe fixedly carried by the rock shaft in axial alignment therewith, an actuating member having a curved slot receiving said shoe, and means connecting said member to the steering rod for movement in a direction longitudinally of the steering rod but with freedom for movement in a direction to compensate for the curvature in the slot which would otherwise result in a locking action.

9. In a steering gear, the combination of a steering rod, a rock shaft, a curved shoe fixedly carried by the rock shaft on an axis coinciding with the axis of the rock shaft, an actuating member movable by the steering rod adapted to transmit rocking movement to the shoe and rock shaft, said member having a curved slot receiving said shoe, the curvature of said slot being struck from a center coinciding with the center of curvature of the shoe, and said member being movable to maintain said centers coincident to ensure rocking movement of the shoe and rock shaft without binding of the shoe in the slot.

10. In a steering gear, the combination of a steering rod, a rock shaft having an arcuate end portion central of the axis of rotation of the shaft, an actuating member having an arcuate slot of the same curvature as said arcuate end portion and receiving said end portion, and means connecting said member to the steering rod for movement thereby in directions to effect rocking of the rock shaft.

11. In a steering gear, the combination of a steering rod having a threaded portion, a nut engaging said threaded portion, an arcuate slot in a side face of said nut, a rock shaft having an arcuate shoe-like end portion positioned axially thereof, said arcuate shoe-like portion fitting the arcuate slot in said nut whereby movement of the nut by the steering rod effects rocking movement of the rock shaft.

12. In a steering gear, the combination of a steering rod, a rock shaft rotatable on an axis at right angles to the axis of the steering rod, an actuating member having a curved slot in a face thereof, means connecting said member to the steering rod for movement thereby, and a shoe fixedly carried by the rock shaft axially thereof and fitting said slot whereby movement of the slotted member by the steering rod effects rocking movement of the rock shaft.

13. A steering gear comprising a steering rod, a rock shaft, an actuating member for imparting rocking motion to the rock shaft, and means connecting the actuating member to the steering rod for movement thereby, said actuating member having an arcuate slot and said rock shaft having an arcuate shoe fixed thereon axially thereof and fitting the slot.

14. In a steering gear for automobiles, the combination of a steering rod, a rock shaft, and a quick acting irreversible driving connection therebetween comprising two interfitted portions one of which is a cylindrical member cooperating with the steering rod and having a peripheral curved slot which if developed in a flat plane would be an arc of a circle, the other of which fits the slot and is non-rotatable with the shaft, the said other member further having its side faces curved substantially on the same radii as was the side faces of the curved slot, said slot being so annularly and longitudinally disposed as to give a reduction between steering rod and rock shaft.

WILLIAM H. FURNESS.